United States Patent [19]

Klopfenstein et al.

[11] 4,393,950
[45] Jul. 19, 1983

[54] TARE WEIGHING APPARATUS AND METHOD THEREFOR

[75] Inventors: King L. Klopfenstein, Prospect Heights; Robert H. Connors, Chicago, both of Ill.

[73] Assignee: Triangle Package Machinery Company, Chicago, Ill.

[21] Appl. No.: 277,986

[22] Filed: Jun. 26, 1981

[51] Int. Cl.³ ............................................. G01G 13/14
[52] U.S. Cl. ................................... 177/108; 177/114; 177/165
[58] Field of Search ............... 177/165, 164, 114, 115, 177/123, 122, 105, 108, 1.1

[56] References Cited

U.S. PATENT DOCUMENTS

| | | | |
|---|---|---|---|
| 2,914,310 | 11/1959 | Bahrs | 177/212 X |
| 2,930,569 | 3/1960 | Peterson | 177/123 X |
| 3,124,206 | 3/1964 | Burke | 177/165 X |
| 3,126,068 | 3/1964 | Richardson | 177/108 X |
| 3,261,415 | 7/1966 | Hood et al. | 177/68 |
| 3,474,874 | 10/1969 | Pettis | 177/164 X |
| 3,608,656 | 9/1971 | Pettis | 177/108 X |
| 3,656,337 | 4/1972 | McDonald | 177/164 X |
| 3,848,688 | 11/1974 | Klopfenstein | 177/179 |
| 4,100,984 | 7/1978 | Klopfenstein et al. | 177/123 X |

*Primary Examiner*—Joseph W. Hartary
*Attorney, Agent, or Firm*—Emrich, Lee, Brown & Hill

[57] ABSTRACT

Disclosed is a system and method for the high-speed, cyclic batch weighing of a flowable material in which variations in initial scale weight are automatically compensated for. Measuring cycle time is minimized by overlapping the time required to achieve scale stability prior to tare with the material discharge time. Tare weight is automatically measured during a weighing cycle following material discharge while the weight container is open to provide a residue compensation output signal.

16 Claims, 4 Drawing Figures

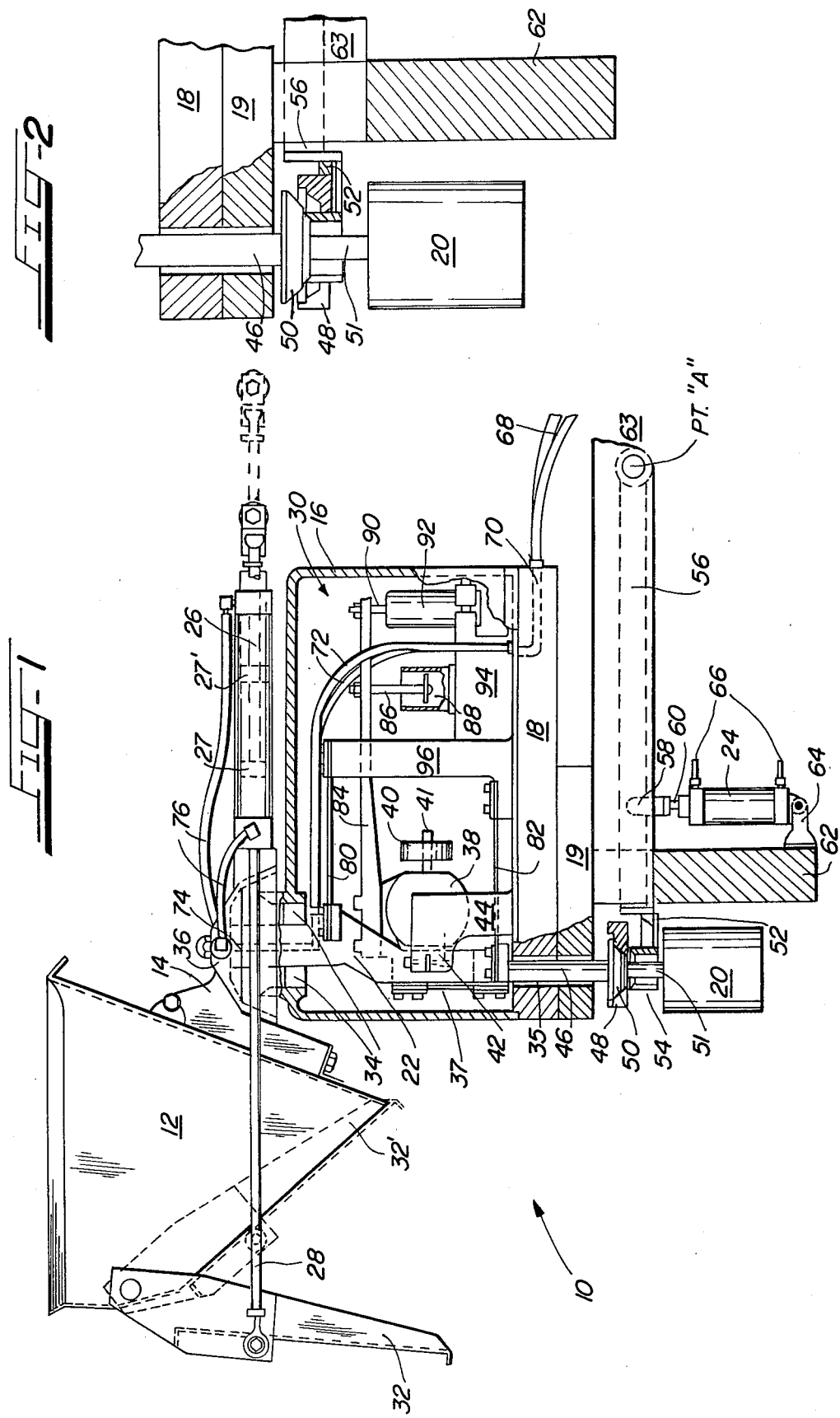

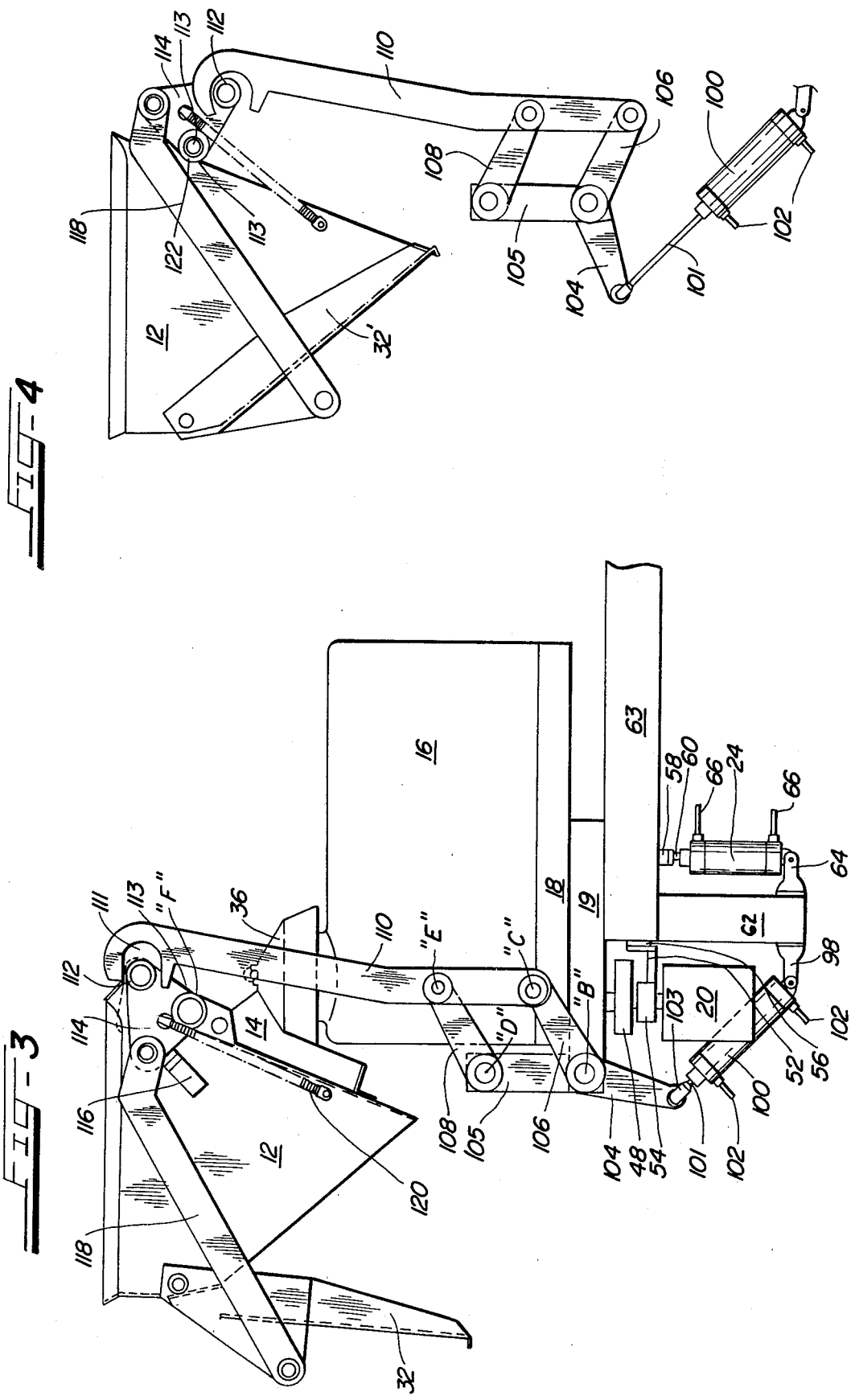

TARE WEIGHING APPARATUS AND METHOD THEREFOR

BACKGROUND OF THE INVENTION

This invention relates generally to weighing systems and particularly relates to an improved weighing apparatus for the high-speed weighing of a cyclically dispensed flowable material and method therefor.

An important area in the field of high speed packaging involves the cyclical dispensing of a supply of particulate materials into sequential batches of uniform weight which are then automatically deposited into a package. Typically a scale is used for weighing the particulate material provided to the scale by means of a hopper, a conveyor, or other means of material transport, and upon reaching a predetermined weight, the flowable material is then deposited in the package. A check weighing approach is generally employed in these package filling machines in which each batch of material is rapidly weighed and those batches which do not fall within some acceptable weight range which includes the ideal weight of the batches are either rejected or modified so as to fall within these packaging weight limits.

Various sources of error are present in these package filling machines resulting in the apparent weight which is being sensed by the weighing means not necessarily being the true weight of the product in the scale receptacle. Random vibrations in the weighing receptacle and elements to which it is connected caused by external forces may affect the apparent weight of the substance on the scale. In addition, the weighing means may not be in its true position due to its response time which is the time it takes for the weighing means to complete its vertical displacement due to a weight being added thereto. This vertical displacement is amplified due to the vertical impact force created by the product in suspension falling on the product already located in the receptacle of the weighing means. Various inputs may also be provided by the means or manner in which the weighing container gate is opened and closed during the discharge of the substance being weighed. The true weight of the product can be check weighed only after the weighing means reaches substantial equilibrium or before equilibrium of the check weighing means has been reached by compensating for erroneous inputs resulting therefrom. To wait for equilibrium may result in a substantial lengthening of the weighing cycle while compensating for a non-equilibrium situation generally requires sophisticated sensors and associated circuitry.

One approach to the check weighing of a charge of product is disclosed in U.S. Pat. No. 4,100,984 to Klopfenstein et al wherein is described a system having a single receptacle, such as a weigh bucket, in which the material to be weighed is provided from a feeding means. While in the receptacle, the initial charge is check weighed and if the weight sensed is less than a predetermined value, additional material is provided to the receptacle until it is within a preferred range of prescribed weights. Provision is made for several check weighing operations after the additional charge of product has been provided to the receptacle with the flow of product stopped when the preferred package weight is realized. Provision is made for either a pulsed feed or a continuous feed of the additional charges of product provided to the receptacle after a check weighing operation until minimum package weight is reached.

U.S. Pat. No. 2,930,569 to Peterson discloses means for controlling the flow of material from a supply hopper. This control means includes a horizontal disc or plate rotatably mounted beneath a stationary plow blade which is positioned in such an attitude that rotation of the disc urges the material thereon against the plow blades and thereby directs the material over the edge of the disc to the inlet, or mouth, of the hopper. The discharge portion of the hopper includes several gates the positions of which are controlled by air cylinder driven piston rods. Similarly, a scale bucket positioned beneath the hopper outlet is provided with dump gates each actuated by means of a piston rod-air cylinder combination. This apparatus is primarily directed toward providing a uniform bulk and dribble flow to the weighing means and is not concerned with eliminating some of the aforementioned inaccuracies inherent in the weighing process itself.

U.S. Pat. No. 2,914,310 to Bahrs addresses the problem of scale equilibrium by disclosing an electrical damping system in which an electrical signal proportional to the displacement of the weighing platform is generated, amplified and applied to an electromechanical transducer which applies a restoring force to the weighing platform whereby the platform is maintained at or near its equilibrium position and platform movement is damped.

U.S. Pat. No. 3,656,337 to McDonald discloses a device for the periodic and regular calibration of a weighing scale beam used to weigh objects being transported on a continuously moving conveyor belt. Automatic zero adjustment of the weighing scale beam is accomplished by loading a reference weight at the end of the scale beam during a test interval, recording the reference weight on a strip chart recorder, comparing the recorded weight with a predetermined recorded output, and generating a correction signal in response to the comparison and providing the correction signal to a pulse controller in adjusting the load signal produced by the reference weight.

While the aforementioned references address some of the more conventional limitations of prior art high-speed packaging and weighing systems, they do not deal with the problem of variations from cycle to cycle in the weight of the scale elements or material container itself. Weight readings may vary substantially as a result of variations in system temperature and the presence of residue in the weigh container after discharge. These weight variations may become particularly critical where the substance being packaged is of a somewhat glutinous consistency. By compensating for the material thus retained, or the tare weight of the container as it is frequently designated, each subsequently filled increment may be accurately weighed and dumped so that over an extended period of time weighing errors are effectively minimized. Since the material stuck or hung-up in the container is weighed with its companion material when first filled, when it subsequently drops through the container, no error is created. U.S. Pat. No. 3,261,415 to Hood et al discloses a device for feeding solid materials in a continuous process at a given weight for a fixed time interval including a re-zeroing circuit which includes coupled amplifiers and associated circuitry and a control switch. With the switch closed immediately after a dump and before a fill, if the amplifier has an output signal due to material stuck in the container, it is fed back through the re-zero circuit to cancel the signal at the input of the amplifier thus indicating virtually zero output of the amplifier and therefore no material in the container before filling with a new increment.

U.S. Pat. No. 3,474,874 to Pettis also discloses a system for checking tare weight on a cycle-to-cycle basis to avoid batch weight errors due to variations in tare weight. The '874 patent involves the use of a reversible motor which compensates for an incorrect tare weight by operating in such a direction as to compress the effective length of a scale in a predetermined increment so that the scale's zero point coincides with the tare weight. The reversible motor is energized by the outputs of two switching circuits which represent the total weight of the bucket assembly and of the fixed batch weight. If this combined weight exceeds a predetermined value, the reversible motor is driven to change the effective length of the scale so as to compensate for the scale's tare weight.

Ideally, a high-speed, cyclic package filling machine would produce packages of uniform weight all of which are either at the minimum package weight desired, or in excess thereof by such a small amount that material loss is minimized. Such a system would incorporate all of the above-discussed characteristics thus eliminating, or at least minimizing, the aforementioned packaging problems.

BRIEF SUMMARY OF THE INVENTION

The broad concept of the invention relates, generally, to a system and method for more accurately and rapidly cyclically weighing a batch of material at high speed by reducing scale settling time and compensating for scale tare weight. A weigh bucket, or container, provided with a bucket gate is mounted to and an integral part of the weighing device. The bucket gate is opened and closed by means of either an air cylinder or, in another embodiment, over center toggle linkage, which by virtue of its direct coupling to the bucket assembly, reduces operating vibration and scale settling time.

Weigh bucket tare weight is compared with a reference weight each cycle to generate a tare weight reference signal. This comparison is used to generate a tare weight reference signal by means of a scale beam-differential transformer arrangement. The gate of the bucket is then closed by means of a pneumatic control cylinder, the bucket is filled with the material to be weighed and this combined weight is then compared with the tare weight reference signal. When the combined weight indicates that the desired weight of deposited material has been reached, the differential transformer provides a control signal to the gate control cylinder, which is integrally coupled to the bucket gate, for the discharge of the material.

The present invention also contemplates the measuring of scale tare weight during the material weighing cycle with the scale gate in the open position. A tare weight correction signal is thus generated and used to adjust the weight setting to compensate for weight change of the weigh bucket and its related components in compensating for residue left in the weigh bucket from cycle to cycle, or changes in ambient temperature.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a fragmentary plan view of a preferred embodiment of the present invention in which the weigh bucket gate is actuated by means of a pneumatic cylinder-piston rod combination where the closed position of the weigh bucket gate is shown in dotted line form;

FIG. 2 shows the relative positions of the minimum package weight and associated supporting members during the weigh bucket material weighing operation;

FIG. 3 is a plan view of another embodiment of the present invention with the weight bucket gate in the open position and actuated by means of over center toggle linkage in response to the movement of a piston rod in a pneumatic cylinder; and FIG. 4 shows the weigh bucket with its gate in the closed position together with the over center toggle linkage actuation mechanism of the second preferred embodiment of the present invention.

DESCRIPTION OF THE PREFERRED EMBODIMENTS

Briefly, referring to FIG. 1, there is shown a high-speed weighing apparatus 10 in accordance with a preferred embodiment of the present invention. The material to be weighed is deposited from above into weigh bucket 12 which includes movable weigh bucket gate 32. Weigh bucket 12 is rigidly coupled to mounting bracket 14. Mounting bracket 14 is, in turn, mounted on or integral with a shield device 36 which is mounted above housing 16. The operation of weigh bucket gate 32 is controlled by means of the combination of pneumatic cylinder 26 and piston 27 positioned and movable therein. Housing 16 covers package weight support frame 22 and weighing mechanism 30. Connected to package weight support frame 22 by means of support spacers 46 is minimum package weight support 48. In each weighing cycle, the weight of weigh bucket 12, while empty and with weigh bucket gate 32 open, is compared with the minimum package weight 20 by means of weighing mechanism 30, as will hereinafter be described. The tare weight of the weigh bucket 12 thus measured is subsequently compared to the combined weight of the bucket and material therein following bucket gate 32 closure and deposit of the material in the weigh bucket 12. This weighing process is performed by the combination of scale beam 38, multiplier beam 84, and other associated components of weighing mechanism 30 to produce an output signal from differential transformer 92. This output signal is provided to control cylinder 26 for opening bucket gate 32 in discharging the material therefrom when a predetermined weight limit is reached.

More particularly, the weighing mechanism 30 is located in weighing apparatus housing 16. Weighing mechanism 30 includes support frame 22 and scale beam 38 which is rotatably supported by means of structural support 44. Mounted on one side of the counterbalance mass built into scale beam 38 is shaft 41 on which is positioned an adjustable counterbalance mass 40. At the opposite side of the counterbalance mass in scale beam 38 is the rotatable connection to support frame 22 by means of flexure pivots 42. The vertical displacement of support frame 22 caused by the weight of the various components attached thereto imposes a rotational moment on scale beam 38 in a counter-clockwise direction to limiting stops (not shown) about the axis defined by flexure pivots 42. Adjustable counterbalance mass 40 permits scale beam 38 to be calibrated for a particular weight of the minimum package weight 20, the support frame 22 and components attached thereto, i.e., weigh bucket 12, weigh bucket gate 32, control cylinder and pistons 26 and 27, and shield 36. The vertical displacement of support frame 22, the attached components and minimum package weight 20, rotates scale beam 38 by vertical flexures 37, which are connected with suitable clamps, between support frame 22 and the front end of scale beam 38.

Once scale beam 38 is calibrated by means of adjustable counterbalance mass 40, only changes in the weight of the members supported by support frame 22 will cause a rotation of scale beam 38. This will occur when the tare weight of the weighing apparatus 10 changes. By calibrating scale beam 38 by means of adjustable counterbalance mass 40 when weight bucket 12 is empty and free of residual debris, changes in the weight of the combined aforementioned structures will cause the rotation of scale beam 38. Scale beam 38 will thus rotate about the axis defined by flexure pivots 42 in structural support member 44.

Affixed to the upper portion of sale beam 38 is multiplier beam 84. Rotation of scale beam 38 will cause a displacement in the portion of multiplier beam 34 located away from scale beam 38. The end portion of multiplier beam 84 located distally from scale beam 38 is coupled to the movable core 90 of differential transformer 92. Differential transformer 92 is of conventional design to which a source of power (not shown) is connected. A change in voltage level is produced when transformer core 90 is displaced causing a change in inductance in differential transformer 92. Thus, the rotational displacement of scale beam 38 is converted by means of differential transformer 92 to an electrical output signal.

Tare weighing of the bucket assembly is performed in the following manner. With bucket gate 32 in the open position, lifter arm 56, to which "C" lifter ring 54 is attached, is lowered by means of displacement cylinder 24. Displacement cylinder 24 is preferably energized by pneumatic pressure changes in lines 66 and is coupled to lifter arm 56 by means of piston rod 60 and coupling 58. As shown in FIG. 2, when lifter arm 56 is lowered, "C" lifter ring 54 is also lowered as is minimum package weight 20 which includes support disc 50 and spacer 51. The lowering motion of lifter arm 56 transfers the weight of minimum package weight 20 from the "C" lifter ring 54 to minimum package weight support 48.

With support disc 50 of minimum package weight 20 resting on minimum package weight support 48, which is connected to support frame 22 by support spacers 46, minimum package weight 20, with its support disc 50 and spacer 51, is thus compared with the empty weight of weigh bucket 12 by means of scale beam 38. With the rotational displacement of scale beam 38 resulting in the translational displacement of the end of multiplier beam 84, an electrical output of thus induced in differential transformer 92. Following tare weight measurement and generation of the tare weight reference signal, a control signal is provided by conventional means to gate control cylinder 26 for bucket gate closure. This readies the system for material weight measurements.

Common current practice is to open the bucket gate to release the material in the weigh bucket, close the gate, and then take a tare reading after the weighing device has settled from the shock of gate closing. This procedure requires a longer weighing cycle than when the tare reading is taken after the gate is opened and the material is discharged from the weigh bucket because the weighing device begins to stabilize from the shock of gate opening while the material is being released from the weigh bucket.

The tare weight of the weighing apparatus 10 of the present invention, however, is measured when weigh bucket gate 32 is in the open position in order to reduce weighing cycle time. This tare weighing sequence employs a conventional timing network to which the output of differential transformer 92 is coupled so as to generate a control signal only during these time intervals. With the tare weight correction signal thus generated by differential transformer 92, the present invention envisions conventional circuitry and pneumatic coupling to control cylinder 26 in generating a control signal for opening bucket gate 32 when the tare weight-compensated package weight limit is reached. Previously referenced U.S. Pat. Nos. 3,261,415 and 3,474,874 teach the use of tare weight correction circuitry which could be utilized in combination with the present invention.

Differential transformer 92 is supported by means of support member 94. Dashpot piston 86 is connected to multiplier beam 84 and is positioned in dashpot reservoir 88 for damping the motion of multiplier beam 84 thus insuring its smooth and steady movement. Finally, it is to be pointed out that differential transformer 92 is only one of a large variety of electromechanical or pneumatic amplification devices which could be utilized for converting the mechanical displacement of a weigh bucket into a control signal. For example, a variety of units are also available which produce a change in resistance rather than a change in inductance, as previously described, and will work equally as well. Indeed, the present invention is compatible with a strain gauge type of weighing mechanism.

When the material to be weighed is deposited in weigh bucket 12, weigh bucket 12 is displaced downward. Because package weight support frame 22, shield 36 and bracket support 14 are all rigidly coupled to weigh bucket 12, these members also move downward when the material to be weighed is deposited in weigh bucket 12. Upper aperture 34 in the upper surface of weighing apparatus housing 16 and lower aperture 35 through which extend support spacers 46, which are extensions of package weight support frame 22, permit the free vertical movement of package weight support frame 22 within housing 16. Shield 36 covers upper aperture 34 and prevents the entry of contaminants therethrough into weighing apparatus housing 16. Weighing apparatus 10 is subject to fluid exposure during cleaning particularly when perishable food products are being weighed and packaged. The details of liquid-repelling shield device 36 are discussed in U.S. Pat. No. 3,848,688 to Klopfenstein, which is assigned to the assignee of the present application.

The assembly of bucket 12, support bracket 14, shield 36, support frame 22, support spacers 46 and minimum package weight 48 is allowed to move in a substantially vertical direction by means of upper and lower horizontal flexures 80 and 82 during the weighing process. Adjacent ends of horizontal flexures 80 and 82 are clamped to vertical structural member 96 in weighing apparatus housing 16 while the other ends of these flexure members are clamped to package weight support frame 22. Vertical displacement of weigh bucket 12 due to the deposit of material therein and the resulting vertical displacement of support frame 22 cause the bending of horizontal flexures 80 and 82. Two support spacers 46, coupled to the lower portion of package weight support frame 22, are, in turn, coupled to the minimum package weight support 48.

Displacement cylinder 24 is affixed to lifter arm 56 by means of piston rod 60 and coupling 58. With coupling 58 pivotally attached to lifter arm 56, the rotation of lifter arm 56 about point "A" results in the displacement of minimum package weight 20, with its support disc 50, spacer 51 and lifter ring 54 by which it is supported. This displacement is due to the upward displacement of piston arm 60 in displacement cylinder 24. Attached to displacement cylinder 24 are pneumatic lines 66 by means of which an inert gas, such as air, is provided under pressure to the interior of displacement cylinder 24. The vertical displacement of piston rod 60 is caused by a difference in the pneumatic pressure of the gas in pneumatic lines 66. Thus, during a package weighing cycle when a tare reading is taken, displacement cylinder 24 is actuated causing minimum package weight 20 to be lowered onto minimum package weight support 48. At this time, the weight of the empty weigh bucket 12 is compared with that of the minimum package weight 20 to produce a tare weight measurement signal in differential transformer 92 by means of the displacement of multiplier beam 84.

Weighing apparatus housing 16 includes a base member 18 which is mounted upon support base 19 which, in turn, is supported by lower frame member 62. Incorporated in base member 18 are pneumatic line lower conduits 70 to which are connected lower pneumatic lines 68. Pneumatic line lower conduits 70 are, in turn, connected to internal pneumatic lines 72 which are located internal to weighing apparatus housing 16 and are connected to pneumatic line upper conduits 74 which are located in the upper portion of support frame 22 and shield 36. Connected to the upper terminations of upper conduits 74 are pneumatic lines 76 which lead to and terminate in control cylinder 26. Control cylinder 26 opens and closes weigh bucket gate 32 to discharge material from weigh bucket 12 at the proper time in response to a timed signal provided by packaging apparatus with which weighing apparatus 10 operates.

Gate control cylinder 26 is attached to shield 36 by conventional means. Changes in the pneumatic pressure provided to gate control cylinder 26 result in the linear displacement of control piston 27 located therein. Control piston 27 is, in turn, connected to actuator link 28 the other ends of which are pivotally coupled to weigh bucket gate 32. Although not apparent from the drawings, actuator link 28 is U-shaped to permit the parallel extensions thereon to pass on each side of the weigh bucket 12 to couple with the weigh bucket gate 32. As shown in FIG. 1, the open position of the weigh bucket gate is represented by the number 32 which corresponds to the position of the control piston indicated by the number 27. Similarly, the closed weigh bucket gate 32' corresponds to control piston in position 27'.

The structural support provided by gate control cylinder 26, piston 27 and actuator links 28 increases the stability of weigh bucket 12 thus reducing the settling time of weighing apparatus 10 during the opening and closing of weigh bucket gate 32. This permits a reduction of the weighing cycle period allowing weighing apparatus 10 to weigh out more portions of the material to be packaged per unit time. The reliability of weighing apparatus 10 is also enhanced by the integration of the bucket gate 32 with the opening and closing control device. Gate control cylinder 26 eliminates the requirement for a conventionally used weigh bucket door striking mechanism and the large impulse forces associated therewith thus increasing system operating lifetime.

Referring now to FIG. 3, there is shown another embodiment of the present invention. Details regarding those components of the present invention included in housing 16 are the same as previously described and will not be discussed again, nor are they shown in FIG. 3. The following discussion will be directed toward FIGS. 3 and 4 in which weigh bucket gate 32 is shown in the open and closed positions 32 and 32', respectively.

As shown in FIG. 3, a control cylinder 100 is positioned on lower frame member 62 by means of control cylinder mount 98. Changes in the internal pressure of control cylinder 100 will result in the linear displacement of control cylinder piston rod 101 which is connected to door actuator lever 104 by means of coupling 103. The linear displacement of piston rod 101 will cause door actuator lever 104 to rotate about an axis perpendicular to the plane of FIG. 2 at point "B". Coupled to door actuator lever 104 at point "B" is lower parallel link 106 which will also rotate about point "B" when door actuator lever 104 moves.

Lower parallel link 106 is rotatably coupled to door actuator arm 110 to provide vertical displacement thereto when lower parallel link 106 is rotated by door actuator lever 104. For convenience and structural integrity, the coupling between door actuator lever 104 and lower parallel link 106 indicated at point "B" may be mounted on an extension of support plate 19. Vertical support arm 105 is rigidly attached to support plate 19. Upper parallel link 108 is rotatably coupled to support plate 19 at point "D". Upper parallel link is rotatably coupled at point "E" to door actuator arm 110. By thus coupling door actuator lever 104 to door actuator arm 110 by means of vertical support arm 105 and upper parallel link 108, additional support and structural integrity is provided to door actuator arm 110. Thus, when door actuator lever 104 is rotated in a counter-clockwise direction about point "B" by the linear displacement of piston rod 101, actuator arm 110 moves in an upward direction. Similarly, when actuator lever 104 is moved in a clockwise direction of rotation, actuator arm 110 moves in a downward direction.

At the upper end of actuator arm 110 is located U-shaped coupling 111 which is positioned so as to engage roller 112 located on over center toggle arm 114. Over center toggle arm 114 is rotatably coupled to weigh bucket 12 by means of connecting member 113. Over center toggle arm 114 is also rotatably connected to toggle link 118 which, in turn, is rotatably coupled to weigh bucket gate 32. Thus, it can be seen that when door actuator arm 110 is moved vertically by the action of control cylinder piston rod 101 on door actuator lever 104, over center toggle arm 114 is rotated about point "F" so as to linearly displace toggle link 118 in a direction generally parallel to its longitudinal axis in closing and opening bucket gate 32. Over center toggle arm 114 includes stop member 116 for limiting the rotation of over center toggle arm 114 and thus limiting the displacement of the bucket gate in the closed position 32'. Toggle spring 120 provides counter-clockwise rotation to over center toggle arm 114 and permits bucket gate 32 to be actuated by the vertical displacement of actuator arm 110 wherein the inner, opposing sides of U-shaped coupling 111, by simply contacting roller 112, cause bucket gate 32 to be opened and closed. Such a mechanism provides a structure in which the actuator arm 110 does not engage the roller 112 of over center toggle arm 114 during the weighing cycle when the gate is closed or the dumping cycle when the bucket gate is in the open position.

Shown in FIG. 4 is the alternate embodiment of the present invention wherein the bucket gate is in the closed position 32' with toggle link 118 stopped against pivot boss 122 of over center toggle 114, and with actuator arm 110 in the full down position and piston rod 101 fully extended out of control cylinder 100. Toggle spring 120 provides clockwise rotational force to over center toggle arm 114. Vertical support arm 105 coupled to upper parallel link 108 insures the vertical displacement of actuator arm 110 when actuator lever 104 is rotated by piston rod 101.

There has thus been described several embodiments of a weighing apparatus which automatically compensates for scale tare weight variations and which includes a structural configuration for weigh bucket control which provides increased structural integrity for reduced vibration in minimizing weighing cycle time.

While particular embodiments of the present invention have been shown and described, it will be apparent to those skilled in the art that changes and modifications may be made therein without departing from the invention in its broader aspects. The aim of the appended claims, therefore, is to cover all such changes and modifications that fall within the true spirit and scope of the invention.

We claim:

1. A high-speed, particulate material batch weighing apparatus for the cyclic weighing and discharge of individual portions of said material which are of a predetermined, uniform weight and wherein errors caused by changes in the tare weight of said apparatus are compensated for, said apparatus comprising:
   a weighing bucket with a discharge gate;
   first means for measuring the tare weight of said weighing bucket and discharge gate combination when said discharge gate is open following the discharge of said material therefrom and the stabilization of said tare weight and for generating a first control signal following said measurement;
   control means integrally coupled to said discharge gate and to said first means for receiving said first control signal and for closing said discharge gate in response thereto; and
   second means for measuring and comparing the weight of the discharge gate, the weighing bucket and material therein with said tare weight and for generating a second control signal when the weight of said discharge gate, weighing bucket and material therein exceeds said tare weight by said predetermined weight, said second means coupled to said control means for providing said second control signal thereto for discharging the material from said weigh bucket in response thereto.

2. The apparatus of claim 1 wherein said control means includes a pneumatic cylinder having a linearly movable rod and piston combination rotatably coupled to said discharge gate for the opening and closing thereof, the longitudinal axis of said cylinder oriented generally perpendicular to the direction of deposit and discharge of said material for enhanced apparatus stability.

3. The apparatus of claim 1 wherein said control means includes a pneumatic cylinder having a linearly movable piston rod therein coupled by means of movable linkage to a toggle arm rotatably mounted on said weighing bucket, said toggle arm cooperatively coupled to said discharge gate such that rotation of said toggle arm caused by the linear displacement of said piston rod controls the opening and closing of said discharge gate.

4. The apparatus of claim 1 wherein said first means includes a reference weight coupled to a rotational scale beam by means of which the weight of said weighing bucket and discharge gate is compared with said reference weight and signal generating means coupled to said rotational scale beam and responsive to the movement thereof for producing a tare weight reference signal and said first control signal.

5. The apparatus of claim 1 wherein said control means includes a pneumatic cylinder having a linearly movable rod and piston combination rotatably coupled to said discharge gate for the opening and closing thereof.

6. A high-speed, particulate material batch weighing apparatus for the cyclic weighing and discharge of individual portions of said material which are of a predetermined, uniform weight and wherein errors caused by changes in the tare weight of said apparatus are compensated for, said apparatus comprising:
   a weighing bucket with a discharge gate;
   first means for measuring the tare weight of said weighing bucket and discharge gate combination when said discharge gate is open following the discharge of said material therefrom and the stabilization of said tare weight and for generating a first control signal following said measurement;
   control means integrally coupled to said discharge gate and to said first means for receiving said first control signal and for closing said discharge gate in response thereto; and
   second means for measuring and comparing the weight of the discharge gate, the weighing bucket and material therein with said tare weight and for generating a second control signal when the weight of said discharge gate, weighing bucket and material therein exceeds said tare weight by said predetermined weight, said second means coupled to said control means for providing said second control signal thereto for discharging the material from said weigh bucket in response thereto and wherein said second means includes a rotational scale beam, a multiplier beam, signal generating means and signal comparing means for comparing a first signal representing the weight of the discharge gate, the weighing bucket and material therein with a second signal representing said tare weight in generating said second control signal when the comparison between said first and second signals represents said predetermined weight.

7. The apparatus of claim 6 wherein said first means further includes vibration damping means coupled to said multiplier beam and tare weight calibration means coupled to said rotational scale beam.

8. The apparatus of claim 7 further comprising a housing wherein are located said second means and the signal generating portion of said first means, said housing including a plurality of pneumatic conduits passing therethrough in coupling said signal generating means to said control means in providing said control signals thereto.

9. A high-speed, particulate material batch weighing apparatus for the cyclic weighing and discharge of individual portions of said material which are of a predetermined, uniform weight and wherein errors caused by changes in the tare weight of said apparatus are compensated for, said apparatus comprising:

a weighing bucket with a discharge gate;

first means for measuring the tare weight of said weighing bucket and discharge gate combination when said discharge gate is open following the discharge of said material therefrom and the stabilization of said tare weight and for generating a first control signal following said measurement, said first means including a reference weight coupled to a rotational scale beam by means of which the weight of said weighing bucket and discharge gate is compared with said reference weight, a multiplier beam coupled to said scale beam in rotational cooperation therewith and signal generating means coupled to said multiplier beam and responsive to the movement thereof for producing a tare weight reference signal and said first control signal;

control means integrally coupled to said discharge gate and to said first means for receiving said first control signal and for closing said discharge gate in response thereto, said control means including a pneumatic cylinder having a linearly movable rod and piston combination rotatably coupled to said discharge gate for the opening and closing thereof, the longitudinal axis of said cylinder oriented generally perpendicular to the direction of deposit and discharge of said material for enhanced apparatus stability; and second means for measuring and comparing the weight of the discharge gate, the weighing bucket and material therein with said tare weight and for generating a second control signal when the weight of said discharge gate, weighing bucket and material therein is at least equal to said tare weight, said second means coupled to said control means for providing said second control signal thereto for discharging the material from said weigh bucket in response thereto, said second means including said rotational scale beam, said multiplier beam, said signal generating means and signal comparing means for comparing a signal representing the weight of the discharge gate, the weighing bucket and material therein with said tare weight reference signal in generating said second control signal for the opening of the discharge gate and discharge of the material therein.

10. A high-speed, particulate material batch weighing apparatus for the cyclic weighing and discharge of individual portions of said material which are of a predetermined, uniform weight and wherein errors caused by changes in the tare weight of said apparatus are compensated for, said apparatus comprising:

a weighing bucket with a discharge gate;

first means for measuring the tare weight of said weighing bucket and discharge gate combination when said discharge gate is open following the discharge of said material therefrom and the stabilization of said tare weight and for generating a first control signal following said measurement, said first means including a reference weight coupled to a rotational scale beam by means of which the weight of said weighing bucket and discharge gate is compared with said reference weight, a multiplier beam coupled to said scale beam in rotational cooperation therewith and signal generating means coupled to said multiplier beam and responsive to the movement thereof for producing a tare weight reference signal and said first control signal;

control means integrally coupled to said discharge gate and to said first means for receiving said first control signal and for closing said discharge gate in response thereto, said control means including a pneumatic cylinder having a linearly movable piston rod therein coupled by means of movable linkage to a toggle arm rotatably mounted on said weighing bucket, said toggle arm cooperatively coupled to said discharge gate such that rotation of said toggle arm caused by the linear displacement of said piston rod controls the opening and closing of said discharge gate; and second means for measuring and comparing the weight of the discharge gate, the weighing bucket and material therein with said tare weight and for generating a second control signal when the weight of said discharge gate, weighing bucket and material therein is at least equal to said tare weight, said second means coupled to said control means for providing said second control signal thereto for discharging the material from said weigh bucket in response thereto, said second means including said rotational scale beam, said multiplier beam, said signal generating means and signal comparing means for comparing a signal representing the weight of the discharge gate, the weighing bucket and material therein with said tare weight reference signal in generating said second control signal for the opening of the discharge gate and discharge of the material therein.

11. In a system having a weigh bucket with a discharge gate for the high-speed, cyclic batch weighing of a material wherein said batches are of a predetermined, uniform weight, a process for correcting for errors caused by variations from cycle to cycle in system tare weight comprising:

weighing said weigh bucket and discharge gate combination with said discharge gate in an open position following the discharge of said material from said weigh bucket and the stabilization of said tare weight and generating a reference signal representing the stabilized tare weight of said combination;

closing said discharge gate;

depositing the material to be weighed in said weigh bucket;

weighing said discharge gate, weigh bucket and material therein and generating a weigh signal representing the weight thereof;

generating a control signal when said weight signal is at least equal to said reference signal; and providing said control signal to said discharge gate for opening said discharge gate in releasing the material from said weigh bucket.

12. The process of claim 11 further comprising stabilizing said weigh bucket and discharge gate during the tare weighing of said combination by control means rotatably coupled to said discharge gate.

13. The process of claim 12 wherein a pneumatic control cylinder in combination with a linearly movable piston rod located therein controls the operation of said discharge gate and stabilizes the weigh bucket and discharge gate combination during the tare weighing thereof.

14. The process of claim 13 further comprising toggling said discharge gate to the open and closed positions by means of movable linkage in combination with a toggle arm, said combination coupling said movable piston rod and said discharge gate.

15. The process of claim 11 wherein an electrical control signal is generated, said process further comprising converting said electrical control signal to a pneumatic signal and providing said pneumatic signal to said discharge gate for the opening and closing thereof.

16. The process of claim 11 wherein the tare weighing of said weigh bucket and discharge gate combination comprises comparing the weight of said combination with a reference weight while said reference weight is temporarily suspended and converting a difference in said respective weights to said reference signal representing the tare weight of said combination.

* * * * *